United States Patent [19]
DuLac et al.

[11] Patent Number: 6,023,754
[45] Date of Patent: Feb. 8, 2000

[54] MULTIPLE CHANNEL DATA BUS ROUTING SWITCHING INCLUDING PARITY GENERATION CAPABILITIES

[75] Inventors: Keith B. DuLac, Derby; William V. Courtright, II, Wichita, both of Kans.

[73] Assignee: Hyundai Electronics America, San Jose, Calif.

[21] Appl. No.: 08/258,357

[22] Filed: Jun. 9, 1994

Related U.S. Application Data

[63] Continuation of application No. 07/701,921, May 17, 1991, abandoned.

[51] Int. Cl.[7] .................................................. G06F 13/12
[52] U.S. Cl. .............................. 712/33; 712/32; 710/2; 710/3; 714/6
[58] Field of Search .................................. 395/800, 200, 395/250, 325; 364/DIG. 1; 712/1, 32, 33, 39; 710/2, 3, 36, 65, 110; 714/6, 43, 56

[56] References Cited

U.S. PATENT DOCUMENTS

| | | | |
|---|---|---|---|
| 3,648,255 | 3/1972 | Beausoleil et al. | 340/172.5 |
| 3,916,380 | 10/1975 | Fletcher et al. | 340/147 R |
| 4,024,498 | 5/1977 | McIntosh | 340/146.1 F |
| 4,386,416 | 5/1983 | Giltner et al. | 364/900 |
| 4,404,650 | 9/1983 | Kleinert | 364/900 |
| 4,446,515 | 5/1984 | Sauer et al. | 364/200 |
| 4,494,196 | 1/1985 | Greer | 364/200 |
| 4,503,535 | 3/1985 | Budde et al. | 371/11 |
| 4,583,194 | 4/1986 | Cage | 364/900 |
| 4,600,990 | 7/1986 | Gershenson et al. | 364/200 |
| 4,612,613 | 9/1986 | Gershenson et al. | 364/200 |
| 4,761,785 | 8/1988 | Clark et al. | 371/51 |
| 4,773,004 | 9/1988 | Gershenson et al. | 364/200 |
| 4,775,978 | 10/1988 | Hartness | 371/38 |
| 4,821,170 | 4/1989 | Bernick et al. | 364/200 |
| 4,914,656 | 4/1990 | Dunphy, Jr. et al. | 371/10.2 |
| 5,140,592 | 8/1992 | Idleman et al. | 371/8.1 |
| 5,175,865 | 12/1992 | Hillis | 395/800 |
| 5,185,876 | 2/1993 | Nguyen et al. | 395/425 |
| 5,206,943 | 4/1993 | Callision et al. | 395/425 |
| 5,210,860 | 5/1993 | Pfeffer et al. | 395/575 |

FOREIGN PATENT DOCUMENTS

| | | | |
|---|---|---|---|
| 369707 | 5/1990 | European Pat. Off. | G06F 3/06 |
| 380851 | 8/1990 | European Pat. Off. | G06F 15/16 |
| 9115822 | 10/1991 | WIPO | G06F 11/20 |

OTHER PUBLICATIONS

"A Case for Redundant Arrays of Inexpensive Disks (RAID)" by David A. Patterson, et al., Computer Science Division (EECS), University of California, Report No. UCB/CSD 87/391; Dec. 1987.

"Parity Striping of Disc Arrays: Low–Cost Reliable Storage With Acceptable Throughput" by Jim Gray, et al., Tandem Computers, Technical Report 90.2, Jan. 1990, Part No.: 39596.

*Primary Examiner*—Meng-Ai T. An
*Assistant Examiner*—Dzung C. Nguyen
*Attorney, Agent, or Firm*—Townsend and Townsend and Crew LLP

[57] ABSTRACT

A bus switch providing versatile data path routing between a first group of busses associated with a disk array controller and a second group of busses associated with the individual disk drives within the disk array. The bus switch comprises a plurality of bus multiplexers, equal in number to the number of drive busses. Each bus multiplexer includes a plurality of inputs, each input being connected to a corresponding one of the controller busses. The multiplexers are responsive to select and enable signals to connect selected controller busses to selected drive busses. The bus switch additionally includes a plurality of bus multiplexers for directing data from the drive busses to the controller busses. A parity generator comprising an exclusive-OR circuit is integrated with the bus switch. The output of the parity generator is also provided to each of the multiplexers and can be directed thereby to any of the controller or drive busses.

7 Claims, 6 Drawing Sheets

FIG. 5

MULTIPLE CHANNEL DATA BUS ROUTING SWITCHING INCLUDING PARITY GENERATION CAPABILITIES This is a continuation of application Ser. No. 07/701,921, filed on May 17, 1991, now abandoned.

The present invention relates to disk arrays for the storage of information within a computer system and, more particularly, to a routing device for providing bus mapping between a host computer system and individual disk drives within an array.

BACKGROUND OF THE INVENTION

Disk arrays comprising a multiplicity of small, inexpensive disk drives connected in parallel have emerged as a low cost alternative to the use of single large disks for non-volatile storage of information within a computer system. The disk array appears as a single large fast disk to the host system but offers improvements in performance, reliability, power consumption and scalability over a single large magnetic disk.

Several disk array design alternatives were presented in an article titled "A Case for Redundant Arrays of Inexpensive Disks (RAID)" by David A. Patterson, Garth Gibson and Randy H. Katz; University of California Report No. UCB/CSD 87/391, December 1987. The article, incorporated herein by reference, describes five disk array arrangements, referred to as RAID levels. The first level RAID comprises N disks for storing data and N additional "mirror" disks for storing copies of the information written to the data disks. RAID level 1 write functions require that data be written to two disks, the second "mirror" disk receiving the same information provided to the first disk. When data is read, it can be read from either disk.

RAID level 3 systems comprise one or more groups of N+1 disks. Within each group, N disks are used to store data, and the additional disk is utilized to store parity information. During RAID level 3 write functions, each block of data is divided into N portions for storage among the N data disks. The corresponding parity information is written to a dedicated parity disk. When data is read, all N data disks must be accessed. The parity disk is used to reconstruct information in the event of a disk failure.

RAID level 4 systems are also comprised of one or more groups of N+1 disks wherein N disks are used to store data, and the additional disk is utilized to store parity information. RAID level 4 systems differ from RAID level 3 systems in that data to be saved is divided into larger portions, consisting of one or many blocks of data, for storage among the disks. Writes still require access to two disks, i.e., one of the N data disks and the parity disk. In a similar fashion, read operations typically need only access a single one of the N data disks, unless the data to be read exceeds the block length stored on each disk. As with RAID level 3 systems, the parity disk is used to reconstruct information in the event of a disk failure.

RAID level 5 is similar to RAID level 4 except that parity information, in addition to the data, is distributed across the N+1 disks in each group. Although each group contains N+1 disks, each disk includes some blocks for storing data and some blocks for storing parity information. Where parity information is stored is controlled by an algorithm implemented by the user. As in RAID level 4 systems, RAID level 5 writes require access to at least two disks; however, no longer does every write to a group require access to the same dedicated parity disk, as in RAID level 4 systems. This feature provides the opportunity to perform concurrent write operations.

An additional disk array arrangement, referred to as parity striping, is presented in an article titled "Parity Striping of Disc Arrays: Low-Cost Reliable Storage with Acceptable Throughput" by Jim Gray, Bob Horst and Mark Walker; Tandem Computers, Inc., Tandem Technical Report No. 90.2, January 1990. In the parity striping system, only parity information is distributed across the disks, and the parity is mapped as large contiguous extents. Data is not divided among the disks but is stored in the conventional manner.

To utilize any of the disk array configurations described above within a computer system, a data path structure interconnecting the host system data busses with the plurality of disk drives is required. Most systems include a fixed data path structure interconnecting the plurality of disk drives with the host system. However, such a fixed structure frustrates rearrangement of the disk array system to accommodate different quantities of disk drives or different RAID configurations. Additionally, in most disk array systems the host operates as the array controller and performs parity generation and checking, increasing host processing overhead.

OBJECTS OF THE INVENTION

It is therefore an object of the present invention to provide a new and useful bus routing switch which provides bus mapping between first and second sets of data busses.

It is another object of the present invention to provide such a bus routing switch for connecting a host system with a disk array.

It is yet another object of the present invention to provide a new and useful mechanism for bus mapping between a host and a disk array which can be configured to support different disk array configurations.

It is still a further object of the present invention to provide such a mechanism which also includes parity generation and routing.

SUMMARY OF THE INVENTION

There is provided, in accordance with the present invention, a bus switch for coupling selected members of a first plurality of busses with selected members of a second plurality of busses. The bus switch comprises a plurality of bus multiplexers, equal in number to the number of busses in the second group of busses. Each bus multiplexer includes a plurality of inputs, wherein each one of the inputs is connected to a corresponding one of the busses of the first group of busses. The multiplexers are responsive to select and enable signals to connect selected members from the first plurality of busses with selected members belonging to the second plurality of busses.

The embodiment of the invention set forth below includes four busses for connection to a disk array controller and six busses for connection with an array of disk drives. The bus switch includes six bus multiplexers for selectively coupling one or more of the four controller side busses to the six array side busses. Each one of the bus multiplexers is also connected to receive the output of a parity generator, which can thereby be directed to any of the six array side busses. The six bus multiplexers permit the writing of data and parity information from the controller to the disk array. Additional bus multiplexers direct data from the array side busses to the controller side busses during read operations. The described embodiment also includes structure for reconstructing the information stored on a failed disk drive and for checking parity information.

The above and other objects, features, and advantages of the present invention will become apparent from the following detailed specification when read in conjunction with the accompanying drawings in which applicable reference numerals have been carried forward.

DETAILED DESCRIPTION OF THE PREFERRED EMBODIMENT

Figure 1:
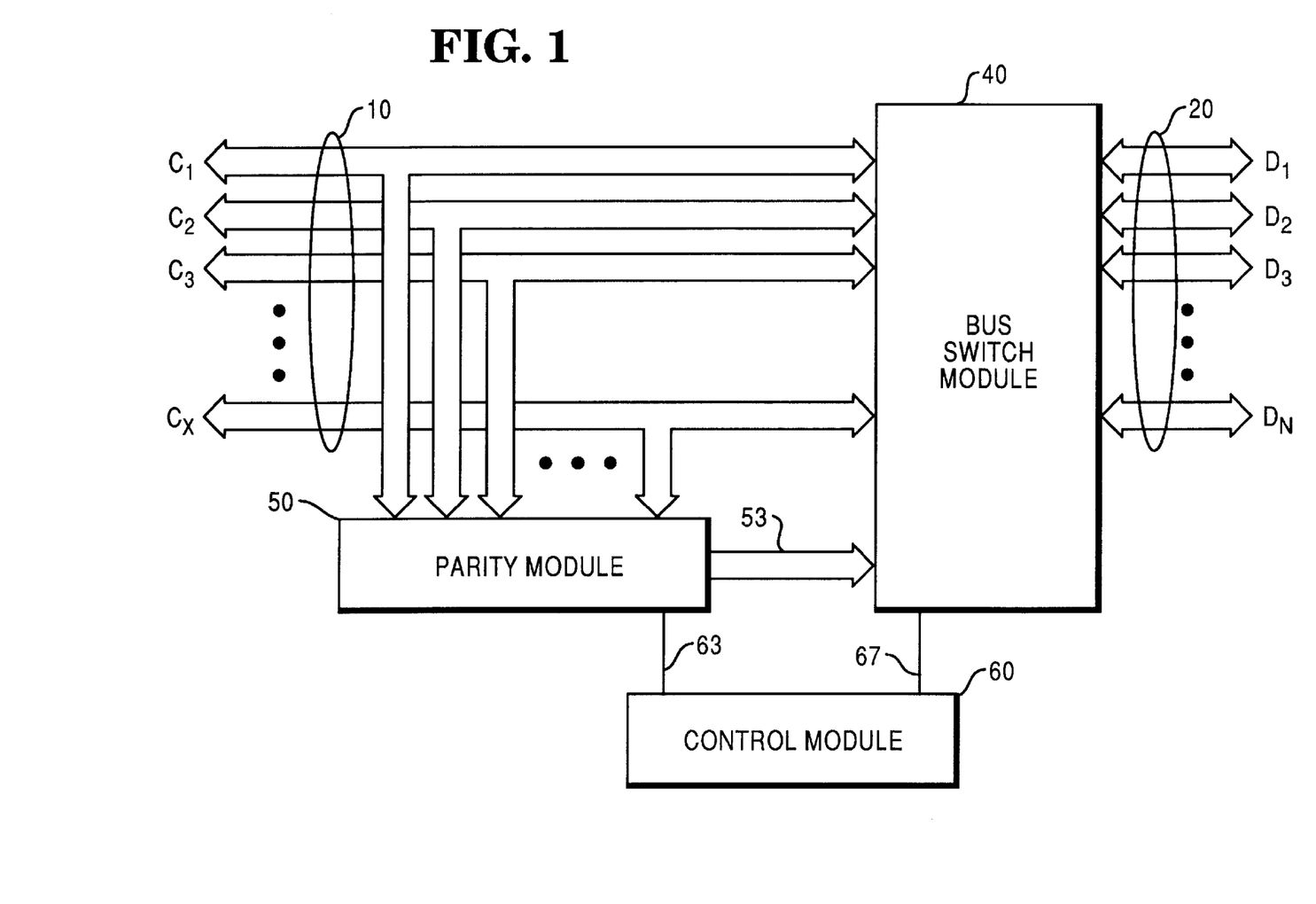
FIG. 1 is a block diagram showing the general architecture for routing data and parity information in accordance with the present invention.

The general architecture for routing data between first and second bus groups in accordance with the present invention is shown in the block diagram of FIG. 1. The architecture disclosed couples a first group of busses associated with a disk array controller (not shown), identified by reference letters $C_1$ through $C_X$, with a second group of busses associated with a plurality of disk drives (not shown), identified by reference letters $D_1$ through $D_N$. The number of controller busses, X, and the number of drive busses, N, are independent of each other and limited only by the implementation of the architecture. All of the busses shown are of the same width.

The architecture is composed of three primary blocks: a bus switch module 40, a parity module 50 and a control module 60. Bus switch module 40 is connected between controller busses $C_1$ through $C_X$ and drive busses $D_1$ through $D_N$. An additional bus 53 connects parity module 50 to bus switch module 40. Details regarding the internal construction and operation of bus switch 40 will be provided with reference to FIGS. 4A and 4B. A discussion of the functions which are provided by bus switch module 40 follows.

Bus switch module 40 provides a unidirectional connection between any controller bus and any drive bus. Multiple connections between several controller busses and an equal number of drive busses is also permitted. Additionally, the bus switch module may provide unidirectional connection of any controller bus to two or more drive busses. Parity information obtained via bus 53 can also be ported to any one of the drive busses.

Parity module 50 includes connections to each of the controller busses for receiving data therefrom and a connection to bus 53 for providing parity information to bus switch module 40. The internal construction and operation of parity module 50 are described below in the discussion of FIG. 5. Parity module 50 generates parity information for RAID level 3, 4 and 5 operations by performing a bit-wise exclusive-OR of each active controller bus. The parity information is provided to bus switch module 40 via bus 53.

Parity module 50 also functions to check parity information for RAID level 3, 4 and 5 read applications by recalculating parity from the data placed upon the controller busses and comparing the recalculated parity to the previously calculated and stored parity information. Reconstruction of drive data for RAID level 3, 4 and 5 applications can also be performed by module 50. Lost drive information can be reconstructed by performing a bit-wise exclusive-OR of the remaining disk drives.

The internal configurations of bus switch module 40 and parity module 50 are controlled by module 60 under the direction of the disk array controller (not shown). Control module 60 also notifies the disk array controller whenever a problem, such as a parity error, occurs.

Figure 2:
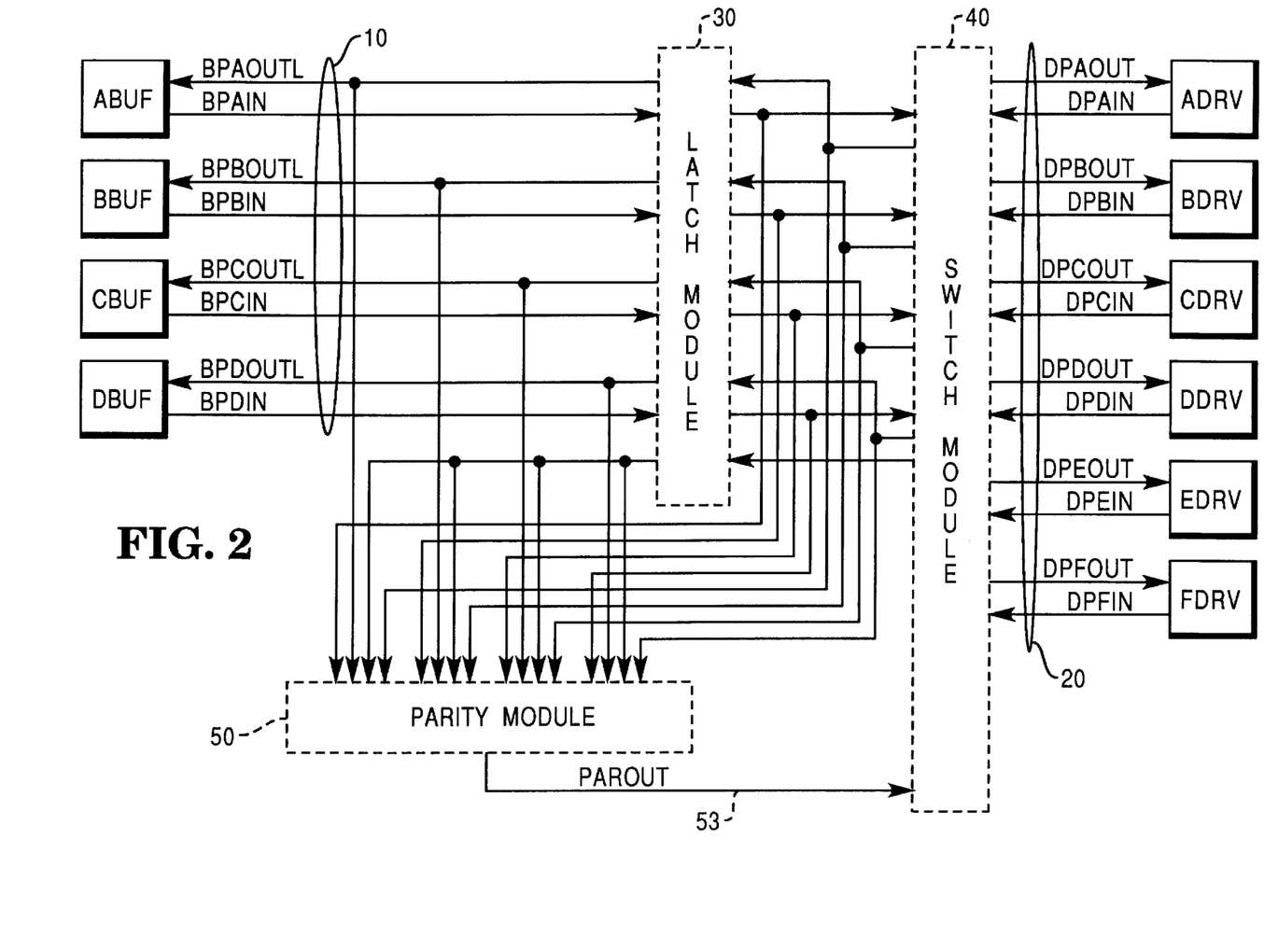
FIG. 2 is a block diagram illustration of a data and parity exchange device including four host ports and six array ports representing a preferred embodiment of the present invention.

A data and parity exchange device including four host ports and six array ports, representing a preferred embodiment of the present invention is shown block diagram form in FIG. 2. The structure shown is formed upon a single semiconductor chip. The four host ports, labeled ABUF, BBUF, CBUF and DBUF, provide connection to four external controller busses. The array ports, identified as ADRV, BDRV, CDRV, DDRV, EDRV and FDRV, connect with six external disk drive busses.

In addition to switch module 40 and parity module 50, a latch module 30 is included on the chip. Within the chip, internal busses BPAOUTL, BPBOUTL, BPCOUTL and BPDOUTL provide data to the four host ports and busses BPAIN, BPBIN, BPCIN and BPDIN conduct data from the host ports to latch module 30 and parity module 50. The six internal busses labeled DPAOUT, DPBOUT, DPCOUT, DPDOUT, DPEOUT and DPFOUT transmit data from switch module 40 to the drive ports and busses DPAIN, DPBIN, DPCIN, DPDIN, DPEIN and DPFIN provide data from the array ports to module 40.

Figure 3:
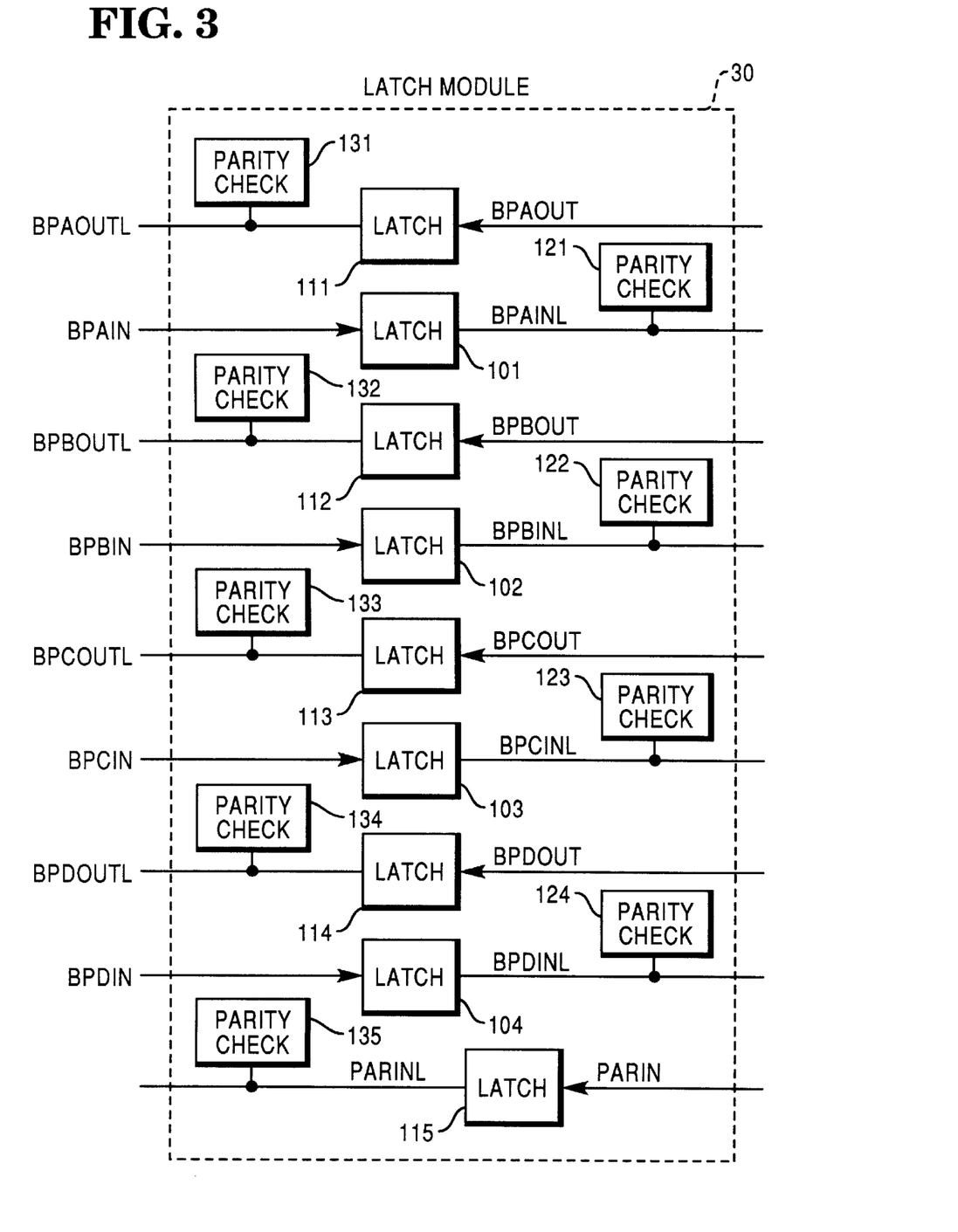
FIG. 3 is a block diagram illustration of the latch module shown in FIG. 2.
Figure 4A:
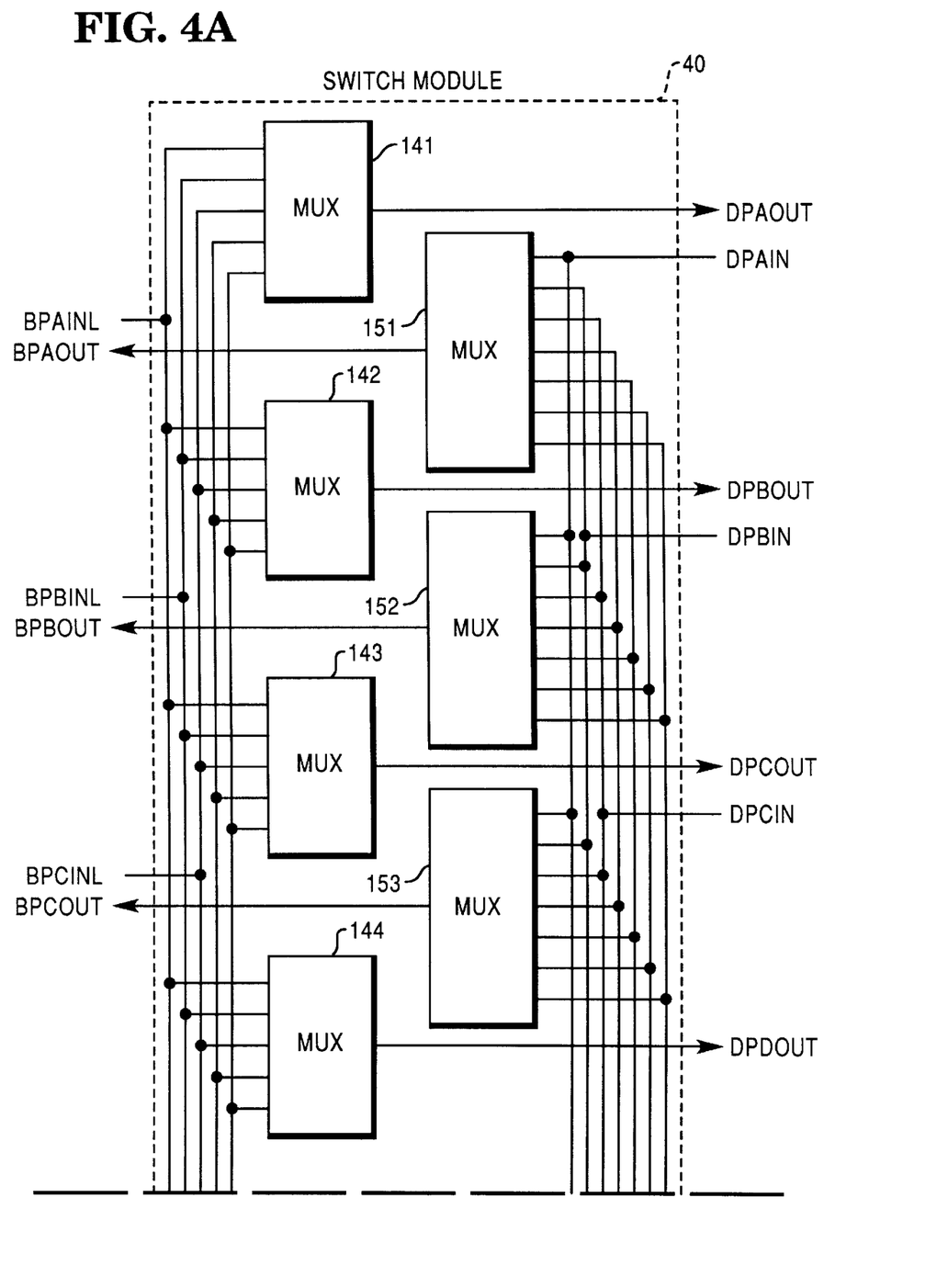
FIGS. 4A and 4B illustrate in block diagram form the internal structure of the bus switch module shown in FIG. 2.
Figure 4B:
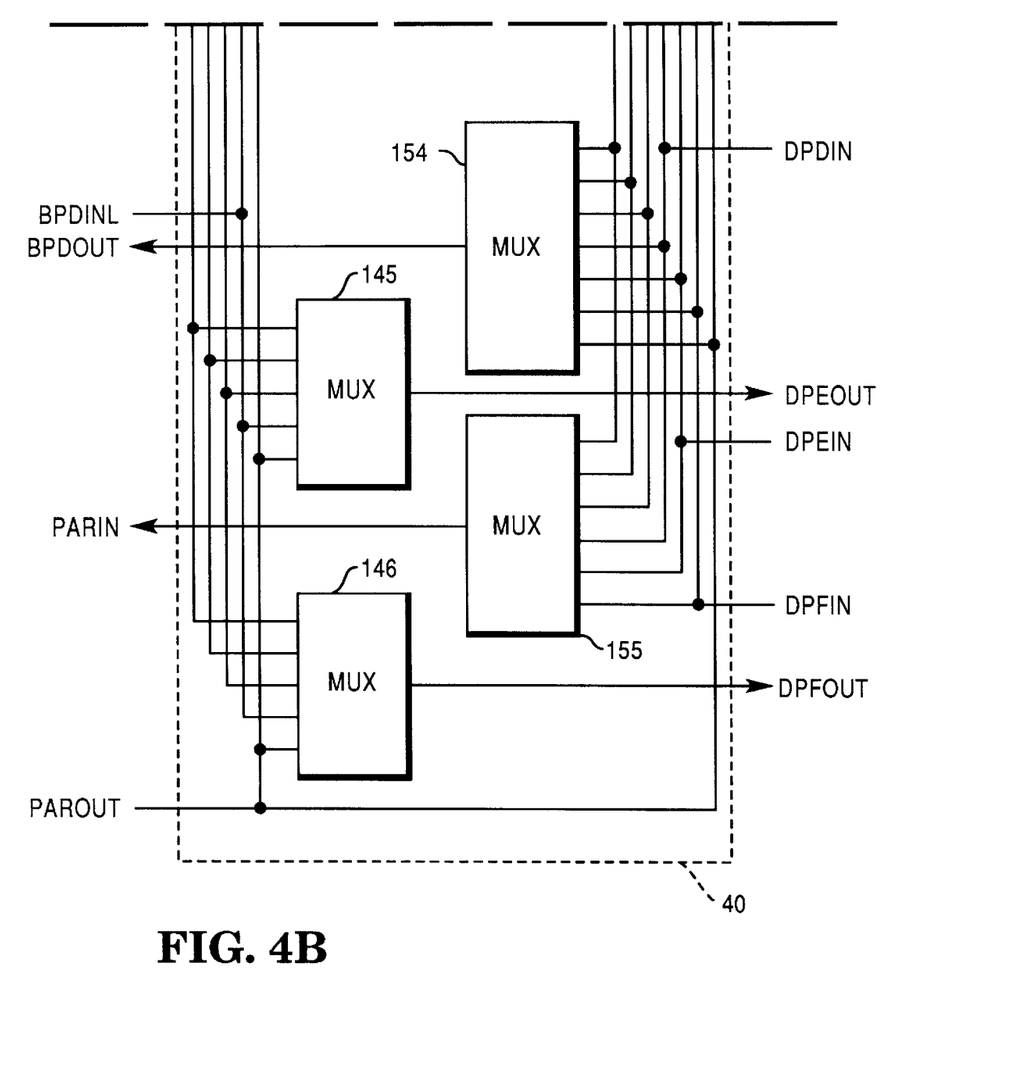
Figure 5:
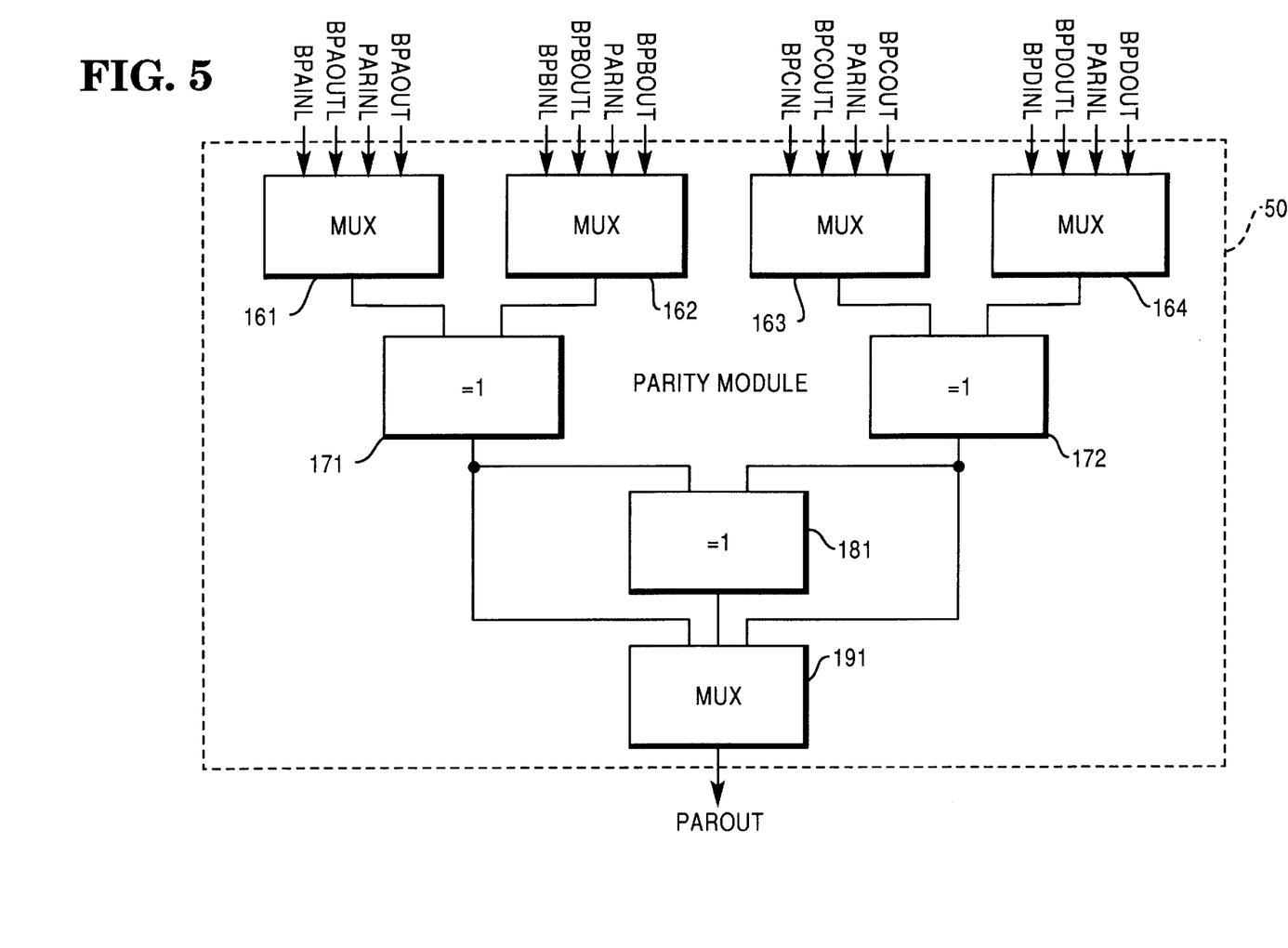
FIG. 5 is a block diagram illustration of the parity module shown in FIG. 2.

The internal structures of latch module 30, switch module 40 and parity module 50 are revealed in FIGS. 3, 4, and 5, respectively. Referring to FIG. 3, latch module 30 is seen to comprise four latches, identified by reference numerals 101 through 104, connected to receive data from busses BPAIN, BPBIN, BPCIN and BPDIN, respectively, and provide latched data to switch module 40 via busses BPAINL, BPBINL, BPCINL and BPDINL, respectively.

Latch module 30 further includes five bus latches 111 through 115 connected to receive data from bus switch module 40 via busses BPAOUT, BPBOUT, BPCOUT, BPDOUT and PARIN, respectively. The outputs of latches 111 through 114 are provided to busses BPAOUTL, BPBOUTL, BPCOUTL and BPDOUTL, respectively. The output of latch 115 is connected via bus PARINL to parity module 50.

Latches 101 through 104 and 111 through 115 are responsive to control signals received from the control module (not shown) to latch or pass received data. Also shown in FIG. 3 are parity check circuits, identified by reference numerals 121 through 124 and 131 through 135, connected to the outputs of each of the latches. Each one of the parity check circuits generates an error signal which is provided to the control module whenever a parity error is detected.

FIGS. 4A and 4B provide a block diagram illustration of the internal structure of bus switch module 40 shown in FIG. 2. Module 40 includes six 5:1 multiplexers 141 through 146. The corresponding inputs of each multiplexer are connected to busses BPAINL, BPBINL, BPCINL, BPDINL and PAROUT, the output of parity module 50. The outputs of multiplexers 141 through 146 are connected to busses DPAOUT, DPBOUT, DPCOUT, DPDOUT, DPEOUT and DPFOUT, respectively.

Switch module 40 further includes four 7:1 bus multiplexers identified by reference numerals 151 through 154. The corresponding inputs of each one of multiplexers 151 through 154 are connected to busses DPAIN, DPBIN, DPCIN, DPDIN, DPEIN, DPFIN and PAROUT. The inputs of a 6:1 multiplexer 155 are also connected to busses DPAIN, DPBIN, DPCIN, DPDIN, DPEIN and DPFIN The outputs of multiplexers 151 through 155 are connected to busses BPAOUT, BPBOUT, BPCOUT, BPDOUT and PARIN, respectively.

Each one of multiplexers 141 through 146 are responsive to select signals received from the control module (not shown) to couple any one of busses BPAINL, BPBINL, BPCINL, BPDINL and PAROUT to the multiplexer's corresponding output bus. Similarly, each one of multiplexers 151 through 155 are responsive to select signals received from the control module to couple any one of busses DPAIN, DPBIN, DPCIN, DPDIN, DPEIN, DPFIN and PAROUT to the bus connected to the multiplexer's output.

The internal structure of parity module 50 is illustrated in the block diagram of FIG. 5. Module 50 includes four 4:1 multiplexers 161 through 164. Multiplexer 161 is connected to receive data from busses BPAINL, BPAOUTL, PARINL and BPAOUT; multiplexer 161 is connected to receive data from busses BPBINL, BPBOUTL, PARINL and BPBOUT; multiplexer 161 is connected to receive data from busses BPCINL, BPCOUTL, PARINL and BPCOUT; and multiplexer 161 is connected to receive data from busses BPDINL, BPDOUTL, PARINL and BPDOUT.

Parity information is calculated and checked, and drive data is reconstructed by performing a bit-wise exclusive-OR of selected busses. Module 50 includes a first exclusive-OR circuit 171 for combining the outputs of multiplexers 161 and 162, a second exclusive-OR circuit 172 connected to combine the outputs of multiplexers 163 and 164, and a third exclusive-OR circuit 181 for combining the outputs of exclusive-OR circuits 171 and 172. The output of parity module 50 is provided by a 3:1 multiplexer 191 connected to receive the outputs of the three exclusive-OR circuits. The output of multiplexer 191 is provided to bus switch 40 which can then direct the parity data to any controller or drive bus as described above.

Multiplexers 161 through 164 are responsive to select signals received from the control module (not shown) to couple selected data busses into exclusive-OR circuits 171 and 172. Multiplexer 191 is responsive to select signals received from the control module to limit the number of busses involved in an exclusive-OR operation. For example, data from four busses may be combined to generate parity during RAID level 3, 4 or 5 write operations, but data from only two busses need be combined to check data saved in an array configured in accordance with RAID level 1.

It can thus be seen that there has been provided by the present invention a simple bus switch which provides the capability to route data between a plurality of data busses. In the embodiment described above, the bus switch provides bus routing between a first group of busses associated with a disk array controller and a second group of busses associated with the individual disk drives within the disk array and further includes the capability of generating parity information.

Those skilled in the art will recognize that the invention is not limited to the specific embodiments described above and that numerous modifications and changes are possible without departing from the scope of the present invention. For example, the bus switch described above provides variable connectivity between four controller side busses and six drive busses. However, the switch can be expanded to accommodate any number of controller or drive data busses. In addition, the structure disclosed above is not limited in use to disk array applications, but may be employed in any application requiring variable connectability between plurality of busses.

These and other variations, changes, substitution and equivalents will be readily apparent to those skilled in the art without departing from the spirit and scope of the present invention. Accordingly, it is intended that the invention to be secured by Letters Patent be limited only by the scope of the appended claims.

What is claimed is:

1. Apparatus for selectively connecting busses within a first plurality of busses with busses within a second plurality of busses, comprising:

a first plurality of bus multiplexers including a bus multiplexer corresponding to each bus within said second plurality of busses, each one of said first plurality of bus multiplexers having an output connected to said bus multiplexer's corresponding bus and having a plurality of inputs corresponding to each bus within said first plurality of busses, each one of said inputs being connected to said input's corresponding bus; and a parity generation circuit having an output and a plurality of inputs corresponding to each bus within said first plurality of busses, each one of said parity generation circuit inputs being connected to said one of said parity generation circuit input's corresponding bus; and wherein each one of said first plurality of bus multiplexers has an additional input connected to the output of said parity generation circuit.

2. The apparatus according to claim 1 further comprising:

a second plurality of bus multiplexers consisting of a bus multiplexer corresponding to each bus within said first plurality of busses, each one of said second plurality of bus multiplexers having an output connected to said one of said second plurality of bus multiplexers corresponding bus and having a plurality of inputs, each one of said second plurality of multiplexers inputs being connected to a corresponding bus within said second plurality of busses.

3. Apparatus for selectively connecting busses within a first plurality of busses with busses within a second plurality of busses, comprising:

a first plurality of bus multiplexers including a bus multiplexer corresponding to each bus within said second plurality of busses, each one of said first plurality of bus multiplexers having an output connected to said bus multiplexer's corresponding bus and having a plurality of inputs corresponding to each bus within said first plurality of busses, each one of said inputs being connected to said input's corresponding bus;

a parity generation circuit having an output and a plurality of inputs corresponding to each bus within said first plurality of busses, each one of said parity generation circuit inputs being connected to said one of said parity generation circuit input's corresponding bus, wherein each one of said first plurality of bus multiplexers has an additional input connected to the output of said parity generation circuit;

a second plurality of bus multiplexers consisting of a bus multiplexer corresponding to each bus within said first plurality of busses, each one of said second plurality of bus multiplexers having an output connected to said one of said second plurality of bus multiplexers corresponding bus and having a plurality of inputs, each one of said second plurality of multiplexers inputs being connected to a corresponding bus within said second plurality of busses; and an additional bus multiplexer having an output and a plurality of inputs corresponding to each bus within said second plurality of busses, each one of said additional bus multiplexer inputs being connected to said one of said additional bus multiplexer inputs corresponding bus, wherein said parity generation circuit includes an additional input connected to the output of said additional bus multiplexer.

4. The apparatus according to claim 3, wherein said parity generation circuit comprises:

an exclusive-OR circuit; and means for selectively connecting the inputs of said parity generation circuit to said exclusive-OR circuit.

5. In a host computer system including a disk array, said disk array comprising a plurality of individual disk drives, a bus routing circuit for selectively connecting data busses associated with the host computer system to disk drive data busses corresponding to the individual disk drives included in said disk array, said bus routing circuit comprising:

a parity generator connected to receive data from each one of said host computer system busses for calculating bus parity information therefrom;

a parity data bus connected to receive parity information from said parity generator; and a bus switch connected to each one of said host computer system busses, said parity bus and each one of said disk drive data busses for selectively coupling said host computer system busses and said parity bus with said disk drive data busses, said bus switch comprising:

a first plurality of bus multiplexers including a bus multiplexer corresponding to each one of said disk drive data busses, each bus multiplexer having an output connected to said bus multiplexer's corresponding disk drive data bus and having a plurality of inputs corresponding to each one of said host system busses and said parity bus, each one of said inputs being connected to said input's corresponding bus;

a second plurality of bus multiplexers including a bus multiplexer corresponding to each one of said host system busses, each one of said second plurality of bus multiplexers having an output connected to said one of said second plurality of bus multiplexers corresponding host system bus and having a plurality of inputs corresponding to each one of said disk drive data busses, each one of said second plurality of bus multiplexers inputs being connected to a corresponding disk drive data bus; and an additional bus multiplexer having an output and a plurality of inputs corresponding to each bus within said second plurality of busses, each one of said additional bus multiplexer inputs being connected to said one of said additional bus multiplexer inputs corresponding bus; and said parity generation circuit includes an additional input connected to the output of said additional bus multiplexer.

6. The apparatus according to claim 5, wherein said parity generator comprises an exclusive-OR circuit.

7. The apparatus according to claim 6, wherein said parity generator further includes means for selectively connecting said host system busses to said exclusive-OR circuit.

* * * * *